J. A. DOUGLAS.
HOG SCALDING TROUGH.
APPLICATION FILED JULY 24, 1909.

981,751.

Patented Jan. 17, 1911.

Witnesses
Wm Smith
Frank B. Hoffman

Inventor
James A. Douglas
By Victor J. Evans
Attorney

UNITED STATES PATENT OFFICE.

JAMES A. DOUGLAS, OF GRAND CHAIN, ILLINOIS.

HOG-SCALDING TROUGH.

981,751.

Specification of Letters Patent. Patented Jan. 17, 1911.

Application filed July 24, 1909. Serial No. 509,348.

*To all whom it may concern:*

Be it known that I, JAMES A. DOUGLAS, a citizen of the United States, residing at Grand Chain, in the county of Pulaski and State of Illinois, have invented new and useful Improvements in Hog-Scalding Troughs, of which the following is a specification.

This invention relates to portable scalding apparatus and has for its object to provide a device of this character that is of simple and effective construction and in which hogs and other animals can be scalded and thence thrown upon a support or table to be scraped.

A further object of the invention is to provide a portable scalding apparatus embodying a scalding pan, a lid or cover for the same, and a fire box situated beneath the pan, said fire box being open at its bottom and having solid side walls which serve as runners and at one end of the fire box is a flue and at the opposite end is a door closed opening so that a draft can be produced through the fire box, it being understood that the fire is built on the ground directly under the apparatus, and as the side walls of the fire box are solid, they confine the flame under the scalding pan and insure a longitudinal draft through the fire box.

With these and other objects in view, the invention comprises the various novel features of construction and arrangement of parts fully described hereinafter and set forth in the claims.

Figure 1:
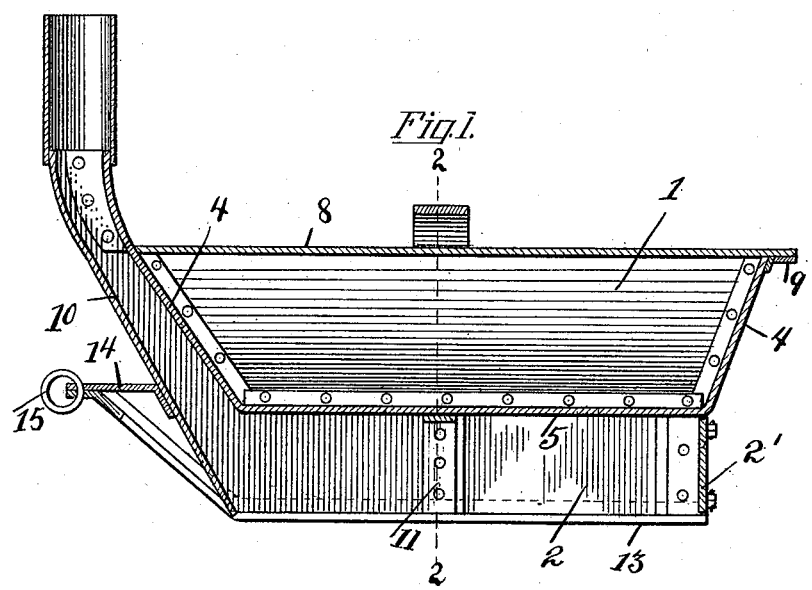
Figure 2:
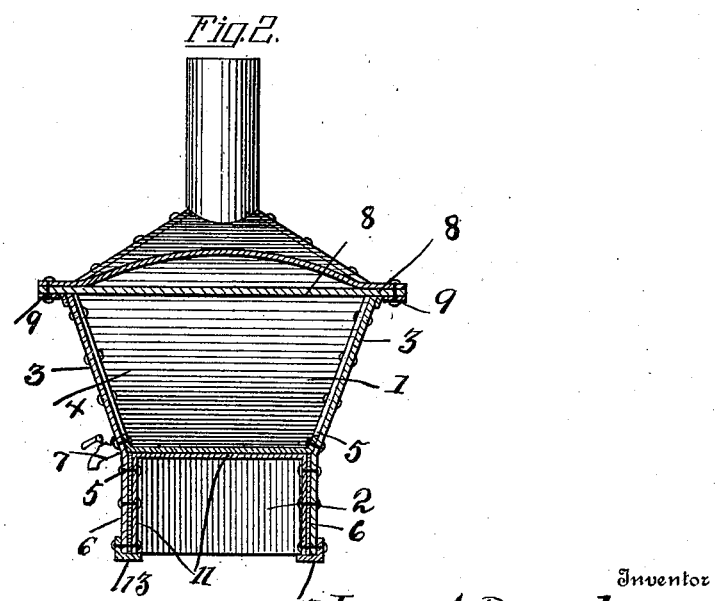

In the accompanying drawings:—Figure 1 is a longitudinal sectional view of my improved apparatus, and Fig. 2 is a cross section taken on the line 2—2 of Fig. 1.

Referring to the drawing the reference character 1 indicates the scalding pan of my improved portable scalding apparatus and 2 the fire box situated beneath the same and provided with an opening at one end for permitting the fire box to be charged with wood and for allowing a draft through the fire box, the opening being controlled by a door 2'. The pan of the device includes spaced inclined side walls 3 inclined end walls 4, and a bottom 5, said bottom being formed integral with the end walls of the pan. The side walls 3 are bent downwardly to form the vertical side walls, as at 6, of the fire box, while the roof or tops of the fire box is formed by the bottom 5 of the scalding pan. Screwed into one of the side walls at or near the bottom of the pan is a drain cock 7 which is used to draw off the water from the pan at any time found desirable.

In the use of my device I provide a cover 8 provided with a suitable handle, said cover having secured strips or cleats 9 upon the under side at the edges thereof for the purpose of holding the said cover upon the pan in applied position. The cover can be swung off of the pan and supported in an inverted position for the purpose of receiving the scalded animal from the scalding pan and the cleats secured upon the outer edges thereof serving to prevent the said animal from slipping off while being cleaned.

At the front of the apparatus or end opposite from the opening of the fire box there is formed a flue or smoke stack, the rear wall of which is formed by one of the end walls or members 4 and a similar wall or member 10 adjacent thereto forming the forward wall. The said walls are closed at their sides by forward extension of the side walls of the pan and fire box.

Secured to the side walls of the fire box and supporting the bottom of the pan is an angular strengthening strip 11. The rear of the said firebox is closed by a suitable door 2'.

Upon the lower or bottom edges of the sides 6 of the fire box are rigidly secured angle iron runners 13, bent upwardly at their forward ends and held fixed in this position by a horizontal brace or rod 14, the latter being secured at one end to the upturned portions of the runners and at the other to the forward wall of the flue. Secured to the forward end of the upturned portions of the runners and the brace bar is a draft ring 15 to which draft animals may be hitched for transportation of the apparatus to desired or convenient places for use or storage.

The fire box is opened at the bottom so that the fire will be built directly on the ground under the apparatus and being thus open at the bottom, the side walls of the fire box better act as runners in drawing the apparatus from place to place. To increase the draft through the fire box, the door 2' can be opened so that the air can pass longitudinally through the fire box and carry the

Having thus described the invention what is claimed as new, is:—

1. The herein described hog scalding trough comprising a pan, an open bottom fire box below the same, and a flue for the fire box, said pan and fire box having common side walls, the bottom of the pan forming also the upper side of the fire box and the inner side of the flue, the sides of the flue being formed by forward extensions of the common side walls of the pan and fire box, the front side of said flue being formed by a wall secured between said forward extensions of the common side walls of the pan and fire box, inverted U-shaped reinforce strips in the fire box having their upper portions bearing under the bottom of the pan and their vertical portions bearing against the inner surfaces of the said side walls of the fire box and bolted thereto, and angle iron runners having horizontal webs lying under and bearing against the lower edges of the sides of said fire box and the vertical portions of said reinforce strips and their vertical webs bearing against the outer sides of said side walls of the fire box, certain of the bolts which secure said reinforce strips in place passing also through said vertical webs of said angle iron runners and securing the latter to said side walls of the fire box and said reinforce strips, said fire box being open at the end opposite from the flue to permit a draft through the fire box, and a door for the open end of the fire box.

2. An apparatus of the class described, comprising a pan, solid walls extending downwardly from the bottom of the pan at the side thereof to form an open bottom fire box and to constitute runners, and a metal wear strip secured to the bottom of each runner and extending longitudinally thereof, and a flue rising from one end of the fire box.

In testimony whereof I affix my signature in presence of two witnesses.

JAMES A. DOUGLAS.

Witnesses:
R. B. ECHOLS,
GRACE G. HORSLEY.